(12) United States Patent
Kim et al.

(10) Patent No.: US 6,722,901 B2
(45) Date of Patent: Apr. 20, 2004

(54) CONNECTOR CAP TO INHIBIT DAMAGE TO A CONNECTOR DUE TO ELECTROSTATIC DISCHARGE

(75) Inventors: Youn Tai Kim, Santa Clara, CA (US); Sung Wook Kim, San Jose, CA (US); Gregory Tran, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/026,047

(22) Filed: Dec. 21, 2001

(65) Prior Publication Data

US 2003/0008543 A1 Jan. 9, 2003

Related U.S. Application Data

(60) Provisional application No. 60/302,940, filed on Jul. 3, 2001.

(51) Int. Cl.[7] .............................................. H01R 13/44
(52) U.S. Cl. ........................................ 439/135; 439/940
(58) Field of Search ................................. 439/135, 940

(56) References Cited

U.S. PATENT DOCUMENTS

| | | | |
|---|---|---|---|
| 5,055,969 A | 10/1991 | Putnam | |
| 5,422,764 A | 6/1995 | McIlvanie | |
| 5,499,161 A | 3/1996 | Hosseinzadeh et al. | |
| 5,583,720 A | 12/1996 | Ishida et al. | |
| 5,737,837 A | 4/1998 | Inaba | |
| 5,757,582 A | 5/1998 | White et al. | |
| 5,899,760 A | * 5/1999 | Ho et al. | 439/135 |
| 6,015,305 A | * 1/2000 | McHugh et al. | 439/135 |
| 6,078,473 A | 6/2000 | Crane et al. | |
| 6,326,553 B1 | 12/2001 | Yim et al. | |

* cited by examiner

*Primary Examiner*—Gary Paumen
(74) *Attorney, Agent, or Firm*—Irell & Manella LLP; Jeffrey P. Aiello

(57) ABSTRACT

A protective cap for an electrical connector of a hard disk drive. The connector is assembled to a hard disk drive that contains one or more electrical circuits. The protective cap can be placed onto the top of the electrical connector to prevent an electrostatic discharged onto the connector. The cap can therefore protect the electrical circuits from damage due to an electrostatic discharge onto the connector.

12 Claims, 2 Drawing Sheets

CONNECTOR CAP TO INHIBIT DAMAGE TO A CONNECTOR DUE TO ELECTROSTATIC DISCHARGE

CROSS-REFERENCE TO RELATED APPLICATIONS

This Application is a non-provisional application of Provisional Application No. 60/302,940, filed on Jul. 3, 2001.

BACKGROUND OF THE INVENTION

1. Field of the Invention

The subject matter disclosed generally relates to the field of hard disk drives.

2. Background Information

Hard disk drives contain a plurality of transducers that are magnetically coupled to rotating magnetic disks. The transducers can write and read information onto the rotating disks by magnetizing and sensing the magnetic field of the disks, respectively. The transducers are integrated into heads that are part of a head gimbal assembly (HGA). The HGAs are typically attached to an actuator arm that is pivotally mounted to a base plate of the drive.

Information is typically stored within a plurality of data sectors. The data sectors are located within annular tracks of the disks. The actuator arm has a voice coil that is coupled to a magnet assembly mounted to the base plate. The voice coil and magnet assembly together create a voice coil motor. The voice coil motor can be energized to pivot the actuator arm and move the transducers to different annular tracks of the disks. The disks, actuator arm and voice coil motor are typically assembled into an enclosed housing commonly referred to as a hard disk assembly (HDA).

The heads are coupled to electrical circuits that are mounted to a printed circuit board. The printed circuit board is sometimes mounted to the outside bottom surface of the HDA housing. The printed circuit board typically has an electrical connector that plugs into a connector of the HDA.

The printed circuit board is typically handled by an operator(s) during the assembly or testing process of a hard disk drive. An operator may come into contact with the electrical connector and generate an electrostatic discharge (ESD) that damages the electrical circuits on the board. Dielectric tape has been placed over the connector to prevent electrostatic discharge into the circuits. It has been found that the tape does not always fully adhere to the connector and thus does not prevent ESD. Additionally, the tape is cumbersome to apply and remove and thus slows down the assembly process.

BRIEF SUMMARY OF THE INVENTION

A protective cap for an electrical connector of a hard disk drive. The protective cap can be placed onto a top surface of the electrical connector to prevent electrostatic discharge on the disk drive through the connector.

DETAILED DESCRIPTION

Disclosed is a protective cap for an electrical connector of a hard disk drive. The connector is assembled to a hard disk drive that contains one or more electrical circuits. The protective cap can be placed onto the top of the electrical connector to prevent an electrostatic discharged onto the connector. The cap can therefore protect the electrical circuits from damage due to an electrostatic discharge onto the connector.

Figure 1:
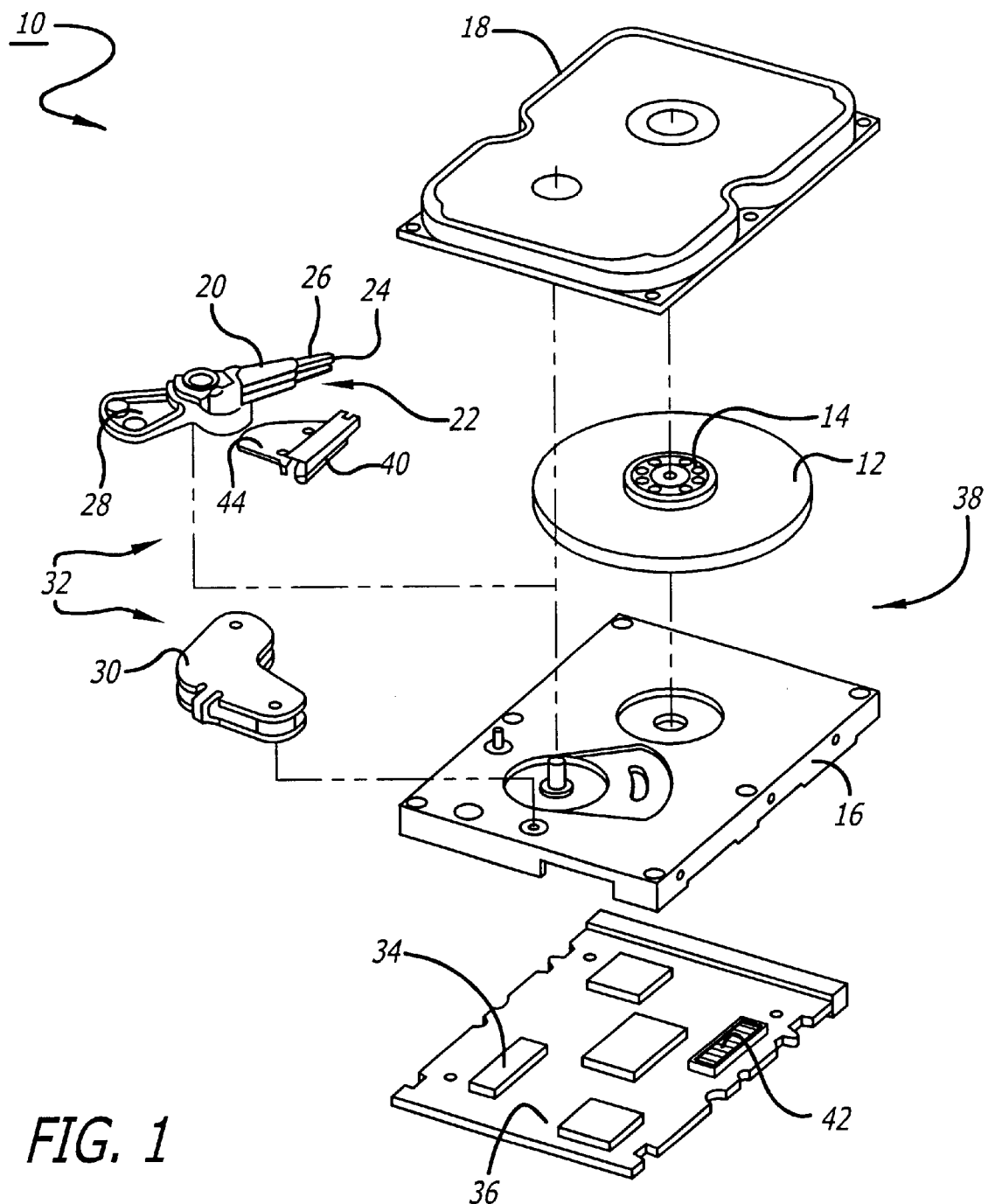
FIG. 1 is an exploded view of a hard disk drive.

Referring to the drawings more particularly by reference numbers, FIG. 1 shows an embodiment of a hard disk drive 10. The hard disk drive 10 may include one or more disks 12 that are rotated by a spindle motor 14. The spindle motor 14 may be mounted to a base plate 16. The drive 10 may also have a cover 18 that is attached to the base plate 16 and encloses the disks 12.

An actuator arm 20 may be pivotally mounted to the base plate 16. A plurality of head gimbal assemblies (HGAs) 22 may be attached to the actuator arm 20. Each HGA 22 may include a head 24 that is gimbal mounted to a flexure arm 26. The flexure arms 26 are attached to the actuator arm 20. The heads 24 contain one or more transducers (not shown) that can magnetize and sense the magnetic field of the disks 12 to write and read information, respectively.

The disk drive 10 may include a voice coil 28 that is attached to the actuator arm 20 and coupled to a magnet assembly 30. The voice coil 28 and magnet assembly 30 define a voice coil motor 32 that can be energized to pivot the actuator arm 20 and move the heads 24 across the disks 12. The heads 24, spindle motor 12 and voice coil motor 32 may all be controlled by electrical circuits 34 that are mounted to a printed circuit board 36. The cover 18 and base plate 16 enclose the disks 12, heads 24 and voice coil motor 32 to form what is commonly referred to as a hard disk assembly (HDA) 38.

The printed circuit board 36 is attached to the base plate 16 of the HDA 38. The disk drive 10 may include a male electrical connector 40 that is attached to the base plate 16 and a mating female electrical connector 42 mounted to the printed circuit board 36. The male connector 40 may be coupled to the heads 24 and voice coil 28 by a flexible circuit board 44. When mated together the connectors 40 and 42 couple the electrical circuits 34 with the voice coil 28 and heads 24.

Figure 2:
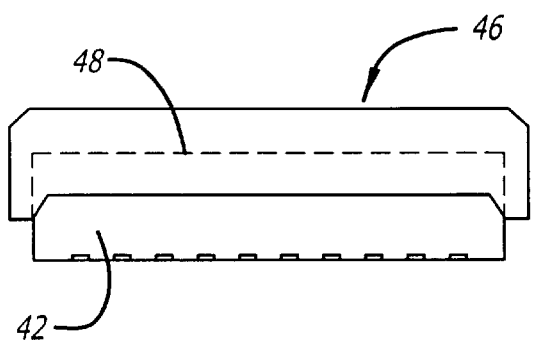
FIG. 2 is a side view showing a protective cap on an electrical connector of the hard disk drive.
Figure 3:
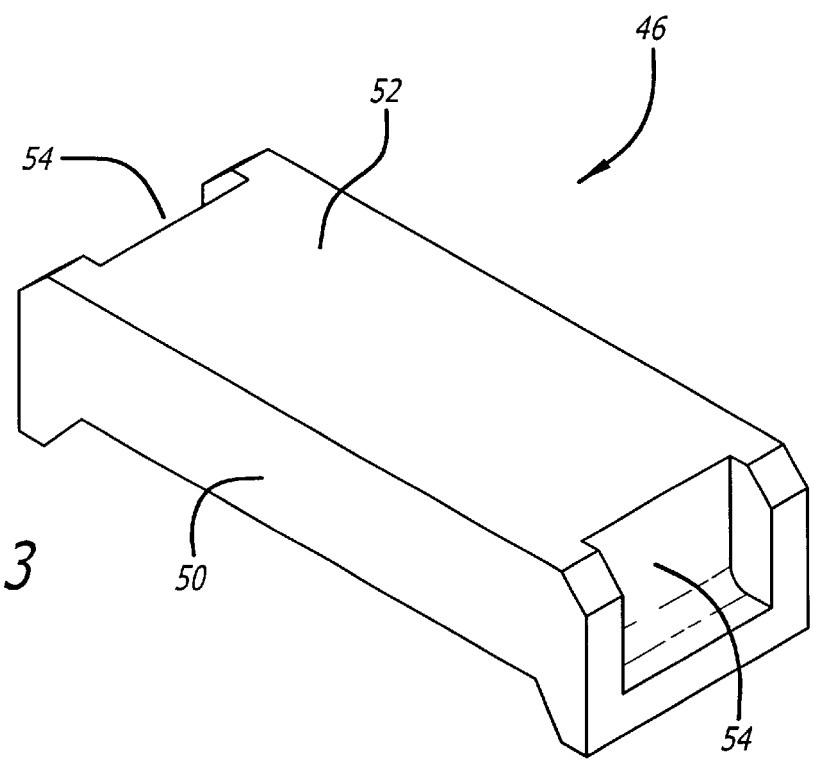
FIG. 3 is a perspective view of the protective cap.
Figure 4:
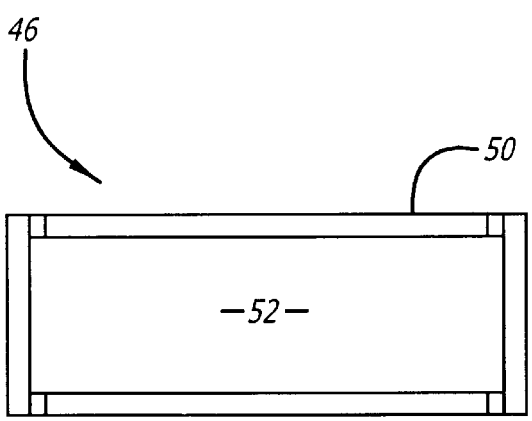
FIG. 4 is a bottom view of a protective cap for the electrical connector assembly.

FIGS. 2, 3 and 4 show a protective cap 46 that covers a top surface 48 of the connector 42. The protective cap 46 may have an outer wall 50 that extends from a top wall 52. The outer wall 50 may be designed to press onto the connector 40 to secure the cap 46 with slip or interference fit. The ends of the protective cap 46 may have notches 54 that allow an operator to grab and remove the cap 46 from the connector 40.

The cap 46 is constructed from a dielectric material to prevent electrical current from flowing therethrough. By way of example, the cap 46 may be constructed from a 40% glass filled thermoplastic material. The dielectric material prevents an electrostatic discharged onto the protected portions of the connector 40.

The cap 46 can be placed onto the electrical connector 42 before or after assembling the connector 42 to the printed circuit board 36. The cap 46 provides a protective cover for the connector 42 when the printed circuit board 36 is handled and transported.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A connector cap for an electrical connector of a hard disk drive, wherein the electrical connector has four side surfaces, a top surface and a plurality of electrical contacts that can be mated with another electrical connector, comprising:

a cap that is adapted to cover the top surface of the electrical contacts of the electrical connector, said cap extends along said side surfaces of the electrical connector.

2. The cap of claim 1 wherein said cap includes an outer wall that extends from a top wall of said housing.

3. The cap of claim 1, wherein said cap includes a pair of notches.

4. The cap of claim 1, wherein said cap is constructed from a glass filled plastic material.

5. A connector assembly for an electrical connector for a hard disk drive, comprising:

an electrical connector that has four side surfaces, a top surface and a plurality of electrical contacts that can be mated with another connector; and, a cap that covers said top surface of said electrical contacts of said electrical connector, said cap extends along said side surfaces.

6. The assembly of claim 5, wherein said cap includes an outer wall that extends from a top wall.

7. The assembly of claim 5, wherein said cap includes a pair of notches.

8. The assembly of claim 5, wherein said cap is constructed from a glass filled plastic material.

9. A connector assembly for an electrical connector for a hard disk drive, comprising:

an electrical connector that has four side surfaces, a top surface and a plurality of electrical contacts that can be mated with another connector; and, means for covering said top surface of said electrical contacts of said electrical connector, and extending along said side surfaces.

10. The assembly of claim 9, wherein said means includes a cap which has an outer wall that extends from a top wall.

11. The assembly of claim 10, wherein said cap includes a pair of notches.

12. The assembly of claim 9, wherein said cap is constructed from a glass filled plastic material.

* * * * *